April 9, 1935.  O. KLEINSCHMIT ET AL  1,997,148
METHOD OF AND MECHANISM FOR THE SEVERANCE OF THREADS
Filed Sept. 18, 1933  5 Sheets-Sheet 3
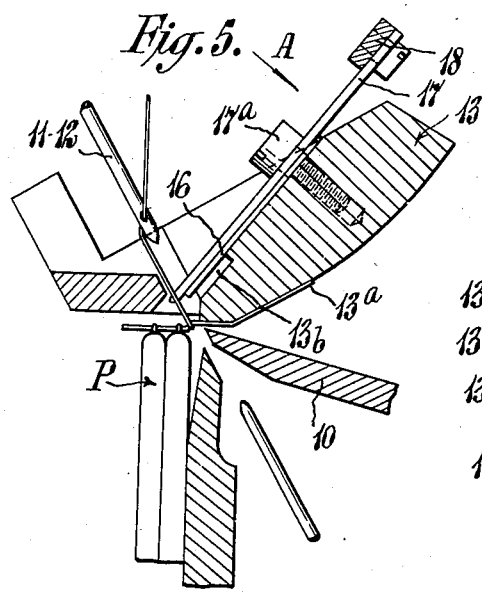
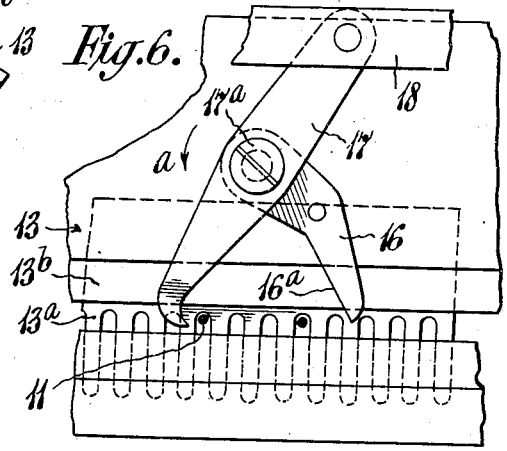
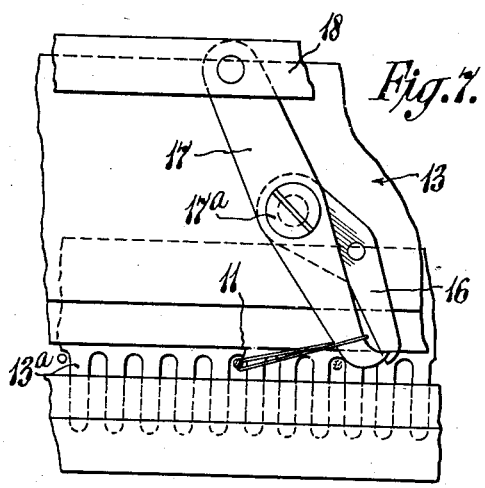
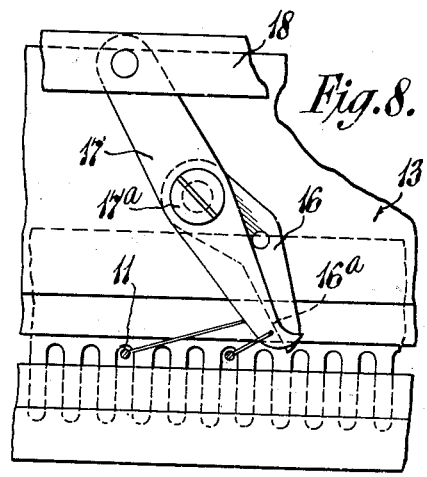
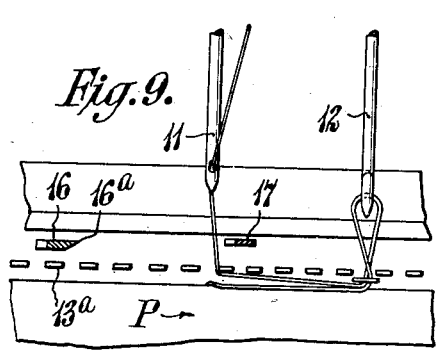
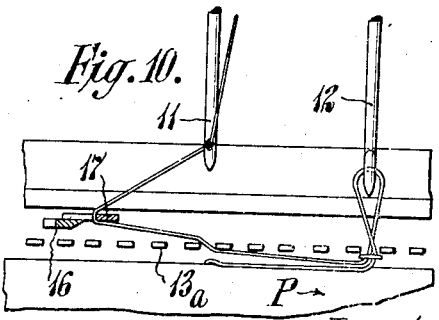
Inventors:
Oscar Kleinschmit
and Rudolf Klemm

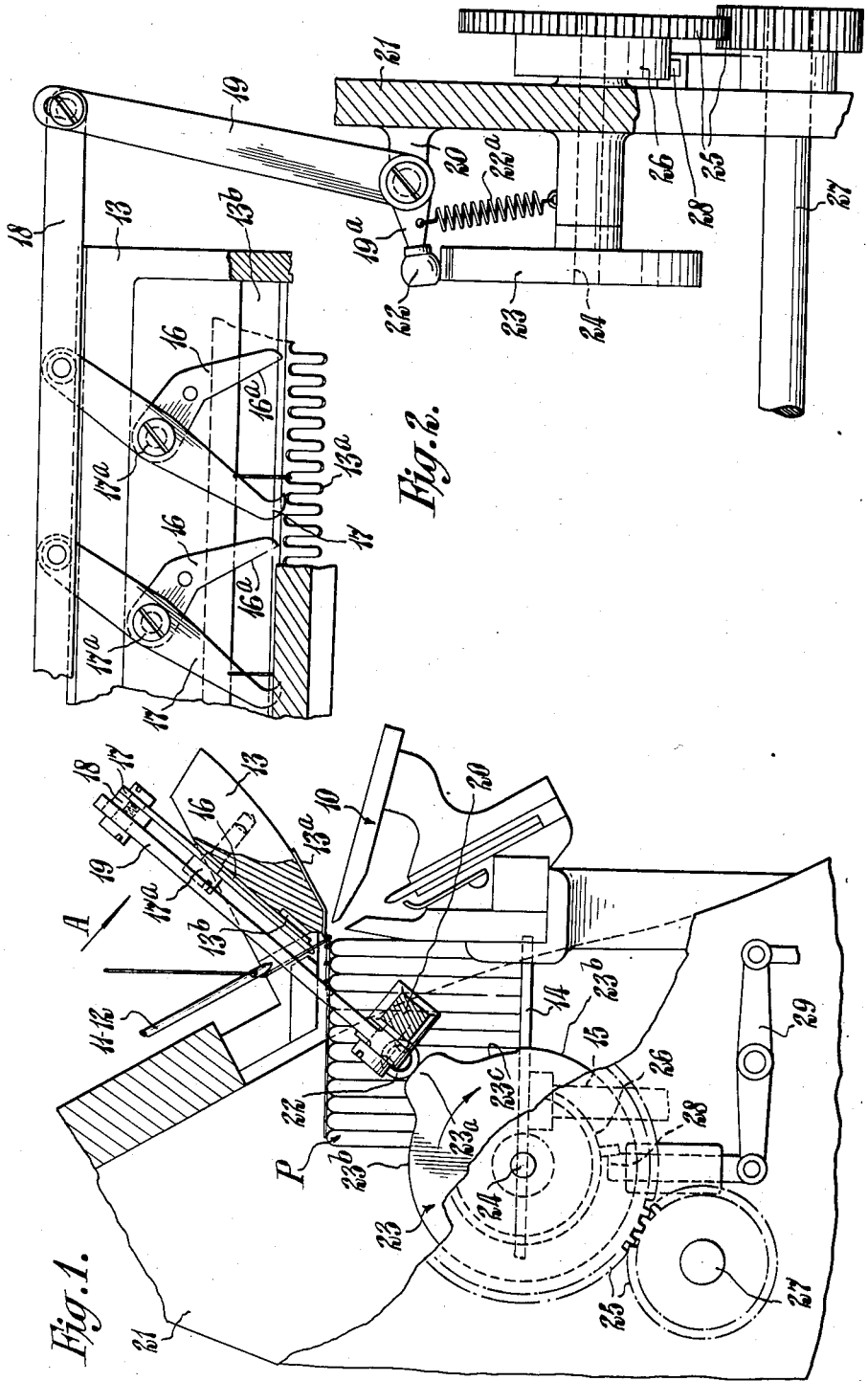

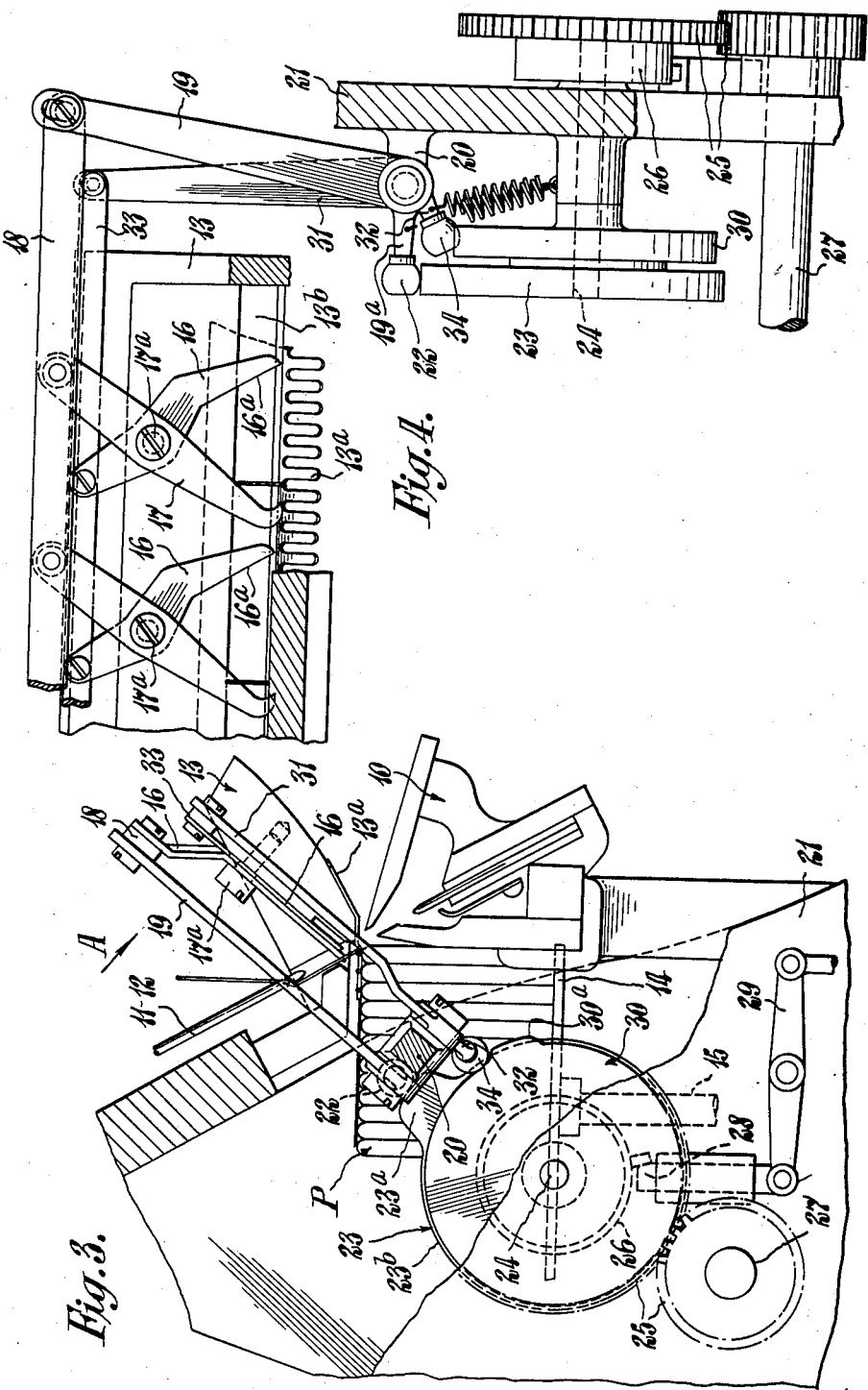

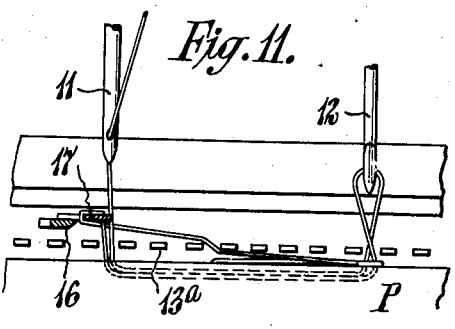
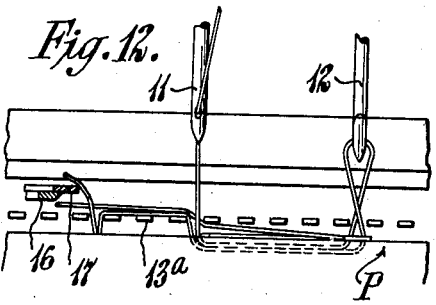
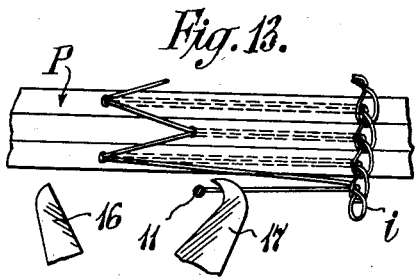
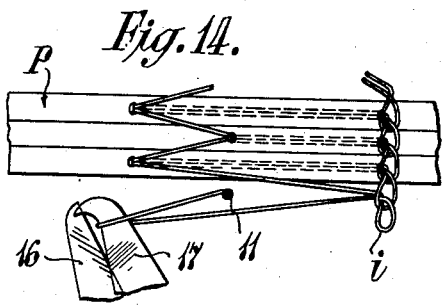
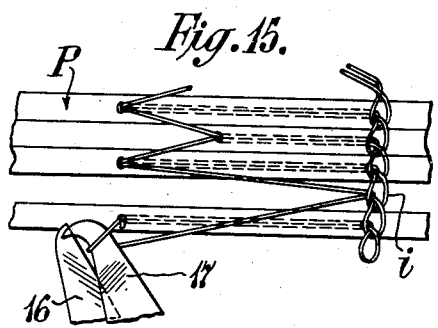
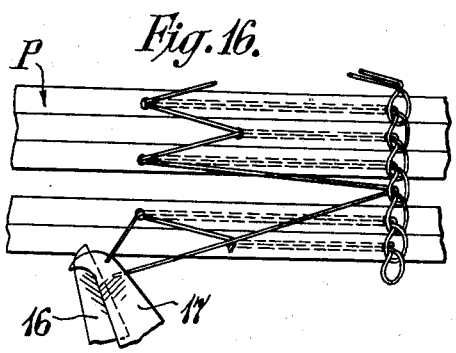
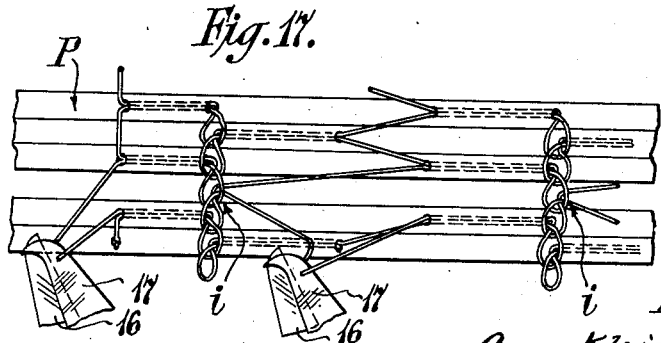

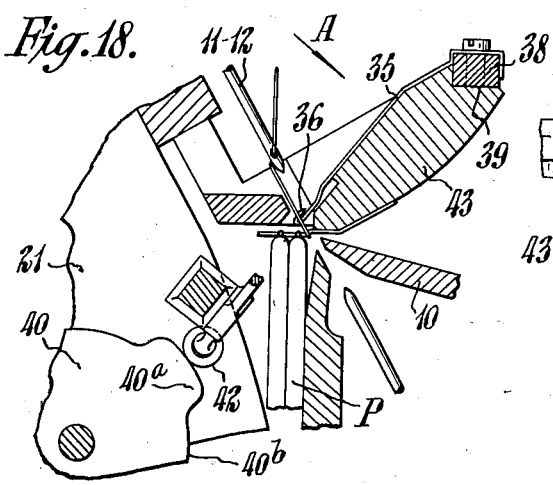
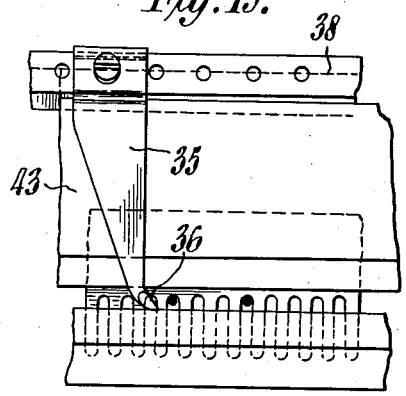
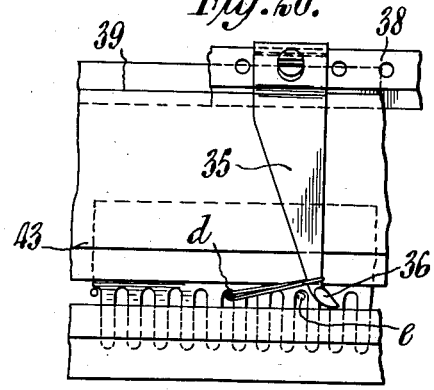
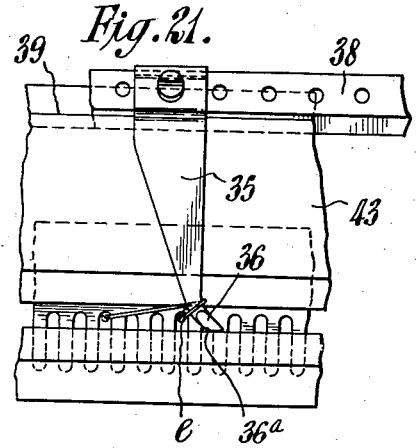
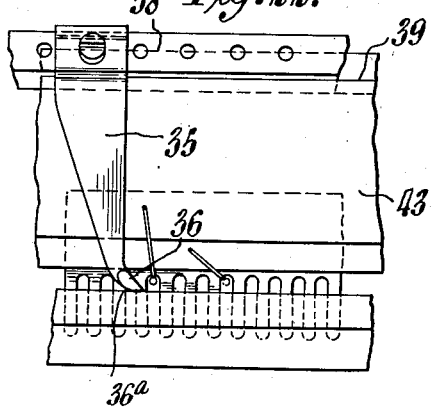
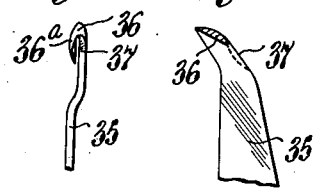

Patented Apr. 9, 1935

1,997,148

UNITED STATES PATENT OFFICE 1,997,148

METHOD OF AND MECHANISM FOR THE SEVERANCE OF THREADS

Oscar Kleinschmit and Rudolf Klemm, Leipzig-Plagwitz, Germany, assignors to Gebruder Brehmer, Leipzig-Plagwitz, Germany, a German firm Application September 18, 1933, Serial No. 690,002
In Germany September 22, 1932

18 Claims. (Cl. 112—252)

The present invention relates to the mechanical severance of threads connecting the adjacent books of a continuously stitched book-pad in a stitching machine and is more particularly directed to the provision of a modification of the method of thread severing set forth in British Patent No. 383,047 of November 10, 1932, which corresponds to copending U. S. application, Serial No. 638,417, filed October 8, 1932, and mechanism for carrying the modified method of thread severing into effect.

When, in some forms of stitching, the severance of the connecting thread is effected according to the method set forth in the specification above mentioned, i. e. prior to the stitching of the first signature of the following book or, in some cases, even immediately after the stitching of the latter, the severed thread hangs loosely in the needle from which it extended before severance. Thus, the short end of the severed thread may tend to spring or withdraw from the eye of the needle and so interrupt the further stitching operation.

Now the object of the present invention is to provide a modified method of mechanical thread severance whereby the severance of the thread is delayed sufficiently to obviate any interference with the further continuous stitching operations.

According to the method of the present invention a thread length leading from a formed stitch to the stitching or looping needle is displaced from the path of the needle so that the severance of the thread is achieved if desired subsequent to the formation of the following stitch or stitches and independently of the movement of the book-pad.

A severing device is already known in which the threads to be severed are looped over a guide member and are advanced in the usual book-trough with the progressing book-pad up to a knife-blade which severs the threads. The guide member which is constructed as a shaft or needle and at the front may have a hook to catch and hold the thread constitutes a very delicate mechanism which is easily damaged and thus rendered inoperative.

In the present invention a thread-engaging member provided, if desired, with a hooked extremity and preferably of comparatively substantial construction is arranged to catch the threads to be severed, immaterially of whether the threads are on the sewing or on the hook needles, urge them to one side and hold them in this position for so long that the severing, which can occur either by an auxiliary motion of the holder or in other manner, no longer affects the further stitching of the next signature. Until the actual severance is effected the thread caught by the engaging member lies at rest immaterially as to how many signatures have been stitched after the catching of the thread by the member referred to and prior to the moment of severance.

The swinging of the thread engaging hook to one side when it is a case of sewing on the backing material can be made so great that the lateral motion of the needles provided therefor cannot strip the thread from the holder.

It is immaterial to the invention whether a stitching system with uniformly stitched signatures is chosen i. e., one in which the stitches are in the same position in each signature or a stitching system in which the stitches are alternately offset. Also it is without significance whether the stitching effected provides double threads or single threads in each signature and whether the looping of the thread to be cut is effected on the sewing needle or on a hook needle used in the formation of the stitches. In the latter case the thread hook will not catch both threads but only one and thus pass into the loop and hold it.

Several constructional embodiments of mechanism which may be used for carrying the method of the present invention into effect will now be described with reference to the accompanying drawings in which:

Fig. 1 is an elevational view of part of a continuous book-stitching machine in which is incorporated one arrangement of mechanism for severing the threads according to the method of the present invention.

Fig. 2 is an elevational view taken in direction of arrow A (Fig. 1).

Fig. 3 is a view similar to Fig. 1 but showing an alternative arrangement of thread severing mechanism for this purpose.

Fig. 4 is a view taken in direction of arrow A (Fig. 3).

Fig. 5 is a fragmentary view drawn to a larger scale and showing in section the stitching saddle, needle bar and a thread sewing needle of the book-stitching machine together with the thread severing device shown in Figs. 1 and 2.

Fig. 6 is a view taken in the direction of the arrow A (Fig. 5) showing the thread engaging and severing device.

Figs. 7 and 8 are views similar to Fig. 6 but showing the thread engaging and severing device in different operative positions relative to the thread to be severed.

Figs. 9 to 12 are views taken at right angles to Figs. 6, 7 and 8 to show the corresponding positions of the sewing and looping needles.

Figs. 13 to 16 are fragmentary plan views of the stitched book-pad, sewing needle and thread engaging member showing the relative positions thereof which correspond to the positions of these members as shown in Figs. 6–12.

Fig. 17 shows the thread severing devices applied to the threads of a book pad which is stitched by alternately offset needles.

Fig. 18 is a view similar to Figs. 1 and 3 but showing the arrangement of a further modified arrangement of thread severing device for carrying into effect the method of the present invention.

Figs. 19 to 22 are fragmentary plan views looking in the direction of the arrow A (Fig. 18) and showing details of the operation of the modified thread severing arrangement, while Figs. 23 and 24 are detail views drawn to a larger scale of the modified thread engaging and severing member.

The machine to which this embodiment of thread severing mechanism is applied, by way of example, is a continuous book-stitching machine of the pivotal sheet carrier type of which is shown in Figs. 1 and 2 the pivotal, saddle-shaped work carrier 10 which is adapted to swing in known manner to and from the stitching position immediately below the thread sewing and looping needles 11, 12. A needle guide or bar 13 and backing strip guide 13a are associated in usual manner with the needles 11, 12, a series of which may extend along the needle bar and transversely of the machine according to the number of stitches which it is desired to insert in each book of the stitched book-pad P. A runway or trough 14 is adjustably mounted upon a suitable support 15 so as to receive the stitched book-pad P, the latter moving in known manner step by step along the trough 14 during the stitching of the books. The thread sewing needles 11 of the machine herein described are adapted to perform a reciprocatory lateral displacing movement in order to effect a staggered stitching of the books as is well known particularly in the type of book-binding in which backing strips are applied to the books. Such lateral displacement of the needles forms no part of the present invention; the means for effecting it are well known and not herein described.

The thread severing device per se is mounted upon the needle bar 13 and in this embodiment comprises a stationary severing member 16 and a pivotal thread engaging member 17 which members in effect form a thread shearing device. (See Figs. 1, 2 and 5-17). The severing member 16 is formed with a cutting edge 16a and is rigidly secured upon the upper inclined face of the needle bar 13 so as to extend downwardly towards the stitched fold edges of the assembled books. The lower extremity of the member 16 extends to the operative plane of the sewing needles and lies to one side thereof while the corresponding portion of the upper face of the needle bar 13 is cut away at 13b to provide clearance for the severing member 16 at the point of engagement of the latter with the thread to be severed.

The thread engaging member 17, which is curved at its lower, thread engaging extremity, is pivotally mounted intermediate its length upon a threaded pin 17a the latter being screwed into the needle bar 13. (Fig. 5). The pin 17a also passes through an extended portion of the severing member 16 to aid in securing the latter to the needle bar 13 while positioning the members 16, 17 in the manner of a pair of shears. The lower curved extremity of the member 17 passes through the operative plane of the needles 11, 12. While merely one thread severing device is above referred to it will be appreciated that a series of such devices usually will be mounted upon the needle bar 13 according to the number of sewing needles used in sewing the book pad. Referring more particularly to Figs. 1 and 2 it will be seen that the thread severing devices are mechanically actuated and manually controlled in the following manner. The upper extremities of the thread engaging members 17 are pivotally secured to a substantially horizontal connecting rod 18 which is linked at one extremity to an upwardly extending lever 19 of a bell crank. The bell crank is pivotally mounted upon a bearing bracket 20 which is secured to a member 21 of the machine frame. The second lever 19a of the pivoted bell crank projects inwards and has a cam follower 22 secured thereto and positioned to contact a cam 23 mounted upon a camshaft 24; a helical spring 22a serves to hold the follower 22 in engagement with the cam 23. A shaft 27 such as the main drive shaft which performs one revolution for each stitching operation, i. e. operative cycle of the machine, is arranged to drive the camshaft 24 through a gear train e. g. of 2:1 ratio so that the cam 23 performs one revolution during the stitching of two successive signatures. The camshaft 24 is linked to the gear train 25 through a one revolution trip clutch 26 which, in well known manner, couples the camshaft and geared drive shaft when the trip finger 28 is depressed through the manually actuated linkage 29 (Fig. 1). The contour of the cam 23 is formed with a rise 23a which serves to lock the thread-engaging member in the inoperative position (Fig. 6). The cam edge recedes abruptly from the rise 23a so that the greater part thereof provides a substantially concentric dwell 23b which terminates in a secondary deeper valley or dwell 23c the latter leading to the rise 23a.

The operation of the above described thread severing devices will be more clearly understood by reference to Figs. 1, 2 and 5 to 17 of the appended drawings. It will be appreciated that normally the thread severing arrangement is in the locked or inoperative position shown in Figs. 1, 2, 5, 6, 9 and 13 i. e. with the cam rise 23a located beneath the cam follower 22 while the cam shaft 24 is stationary. When the stitching of a book of the book-pad P is completed in the normal manner, the operator depresses a pedal (not shown) temporarily to withdraw the trip finger 28 from the clutch 26 which thus is permitted to couple the camshaft 24 to rotate the latter through one revolution thereof. At the moment when the camshaft 24 and cam 23 commence to rotate, the thread carried by the corresponding sewing needle 11 is updrawn from the last formed stitch (in this case an idle stitch $i$, Figs. 9 and 13) so that when the cam follower 22 is urged by the spring 22a to move from the rise 23a to the first dwell 23b of the cam 23 each member 17 is moved about its pivot pin 17a in the direction of the arrow $a$ (Figs. 6 and 7); thus the said updrawn thread is contacted by the hooked extremity of the member 17 and is moved therewith to the right (as viewed in Fig. 7) away from the operative path of the needle 11 (Figs 7 and 10). The chain loop of the thread is held by the corresponding hooked looping needle 12 during the lateral displacement of the sewing thread which is drawn through the sewing needle to permit the semi-looping thereof about the member 17 as shown in Figs. 7, 10 and 14. The dwell 23b of the cam 23, as shown in Fig. 1 extends around the major part of the contour of the cam so that the thread and thread engaging member remain in the position shown in Figs. 7, 10 and 14 during the greater part of the revolution of the cam which extends over two (as described) or any other selected number of subsequent stitch forming operations. In the stitching of the first signature of the next book following the idle stitch above referred to the sewing thread engaged by the member 17 becomes looped thereover as shown in Figs. 11 and 15. During the stitching of the second signature of the new book the cam 23 continues its revolution so that the cam follower 22 drops to the dwell or valley 23c of the cam thus to impart a secondary movement of the member 17 to the left so that the looped sewing thread is brought into contact with the thread severing member 16 and severed (Figs. 8, 12 and 16).

In the completion of the revolution of the cam 23 the rise 23a thereof is brought once more beneath the cam follower 22 whereupon the thread engaging device is moved back to the initial position shown in Fig. 6 while, by reason of the automatic decoupling of the clutch member 26 the entire thread severing device is rendered inoperative until released through the clutch trip for a further thread severing operation.

From the above description of the operation of the mechanism it will be appreciated that the lateral displacement of the sewing needle 11 and thread carried thereby will not affect the successful operation of the thread severing device since the displacing movement of the thread engaging member obviously may be made of greater magnitude than that of the corresponding needle 11. The series of thread engaging members 17 pivotally mounted upon the needle bar 13 would simultaneously be actuated by the connecting rod to operate in the manner above described.

In the modified arrangement of the thread severing mechanism shown in Figs. 3 and 4 the thread severing member 16 is adapted to move in order to effect the severance of the thread. For this purpose the members 16 and 17 are both pivoted intermediate their lengths upon a common pivot pin 17a mounted, as in the first embodiment, upon the needle bar 13. The downwardly extending portions of the members 16 and 17 are positioned relatively to the sewing needles and thread in a similar manner to that above described while in this embodiment the upwardly extending extremities of these members are each pivotally linked to appropriate actuating mechanism which is arranged similarly to that previously described in reference to the first described embodiment. The thread-engaging members are linked to the connecting bar 18 which is actuated from the cam 23 mounted upon the cam shaft 24 while a second cam 30 also mounted upon the cam shaft 24 engages the cam follower 34 carried by a spring-loaded lever 32 of a second bell crank mounted upon the bearing bracket 20. The second lever 31 of the last mentioned bell crank is linked to a connecting rod 33 to which are pivotally attached the upper extremities of the thread severing members 16.

In this embodiment the contour of the cam 23 is fashioned only with the rise 23a and the dwell 23b while the contour of the second cam 30 is substantially concentric except for the one rise 30a. Normally, i. e. when inoperative, the thread severing device is set as shown in Fig. 3. The rise 23a of the cam 23 is positioned beneath the cam follower 22 while the cam follower 34 rests upon the dwell or concentric contour of the cam 30. The camshaft 24 of this embodiment is coupled by the trip clutch 26 and the operation of this embodiment of the thread severing apparatus is similar in timing and effect to that above described except in regard to the final thread severing operation which obviously will be effected by displacement of the member 16 after the member 17 has assumed the position shown in Fig. 7 and prior to its return to the initial position shown in Fig. 6. Obviously the secondary movement of the member 17 is not necessary in this embodiment and due to the modified contour of the cam 23 is not effected in the operation of this modified arrangement.

Another modified arrangement of thread severing mechanism for carrying the method of this invention into effect is shown in Figs. 18 to 24.

The severing device of this modified arrangement comprises a single finger like member 35 having a hooked thread-engaging extremity 36. The hooked extremity of the member 35 is offset from the body thereof and the neck portion between the offset hook and body of the member is formed as a sharpened cutting edge 37. The member 35 in operation is adapted to perform a linear movement and to this end is mounted at its upper extremity upon a slide bar 38 which is slidably located in a recess or slot 39 formed in the upper surface of the needle bar 13.

As shown more clearly in Fig. 18 the device 35 may be mechanically actuated by mechanism similar to that above described in reference to the first and second embodiment. The contour of the cam 40 however is modified in this embodiment since the desired movement of the device 40 is merely a simple delayed reciprocation thereof.

In the operation of this embodiment of thread severing mechanism the device 35 or a series thereof mounted upon the bar 38 is or are moved into contact with the updrawn thread or threads at the appropriate moment by means of the cam mechanism indicated in Fig. 18. When the cam follower 42 moves from the rise 40a on to the dwell 40b of the cam 40 the member 35 is moved from the inoperative position shown in Fig. 19 to contact the updrawn sewing thread and displace the latter to the position shown in Fig. 20. The hooked extremity 36 of the member 35 catches the thread to prevent the deflection of the latter therefrom e. g. during the displacement of the sewing needle from d to e (Fig. 20). During the next stitching operation or operations the dwell 40b of the cam 40 continues to engage the cam follower 42. In the stitching of the first signature of the next book following the above described movement of the member 35 the engaged thread is passed through the needle guide 43 at e (Fig. 21) and thus becomes looped over the cuting edge 37 of the member 35. In the completion of the revolution of the cam 40 the rise 40a thereof passes under the cam follower 42 and thus reciprocates the member 35 to its initial position. In the beginning of the last mentioned movement of the member 35 the cutting edge 37 thereof severs the looped thread to complete the thread severing operation.

Each one of the series of thread severing members 35 mounted upon the bar 38 will be operated simultaneously and in similar manner.

It will be appreciated that the above described method of thread severing can readily be applied to any form of continuous book stitching whether or not idle or locking stitches are employed between the books of the pad produced in the machine. Since the timing of severing operations is not dependent upon the engagement of the threads with a timing device any desired number of signatures may be stitched after the catching of the thread and prior to the cutting thereof. This is important in stitching systems wherein a plurality of sewing threads depend from needles which are actuated alternately as shown in Fig. 17. When in such stitching the severance of the threads is effected too soon e. g. during or even immediately after the stitching of the next signature, the severed thread hangs loosely in the sewing needle and is liable to become withdrawn therefrom. By the present method of severing the threads the actual severance may be delayed until the stitching of the third or fourth subsequent signature. Moreover the mechanical actuation of the severing devices may be modified so that, if desired, two or more series of such devices may be actuated alternately according to the timing of the stitching operations.

The above described thread severing devices have been described merely by way of example and modified arrangements of thread severing mechanism may be devised for carrying the method of the invention into effect without departing from the scope of the appended claims.

We claim:—

1. In a book-stitching machine, mechanism for severing the interconnecting threads of a continuously stitched book-pad, comprising a thread-engaging member, means for displacing said thread-engaging member laterally in an intermittent movement so that a thread leading from the book-pad to a stitching needle is displaced from the path of movement of said needle and subsequently severed in a secondary movement of said thread-engaging member.

2. In a book-stitching machine, mechanism for severing the interconnecting threads of a continuously stitched book-pad, comprising a thread-engaging member formed with a cutting-edge, means for displacing said thread engaging member laterally so that a thread leading from the book-pad to a stitching needle is displaced from the path of movement of said needle and becomes looped over said thread-engaging member, and means for imparting secondary movement to said thread-engaging member to sever said looped thread.

3. In a book-stitching machine, mechanism for severing the interconnecting threads of a continuously stitched book-pad, including a movable thread-engaging member, a stationary thread-severing member, and means for imparting intermittent movement to said thread-engaging member so that the thread to be severed is brought to said thread-severing member and contacted therewith in successive movements of said thread-engaging member.

4. In a book-stitching machine, mechanism for severing the interconnecting threads of a continuously stitched book-pad, including a movable thread-engaging member, a movable thread severing member, means for imparting movement to said thread-engaging member so that a thread leading from the book-pad to a stitching needle is displaced from the path of movement of said needle, and means for imparting movement to said thread-severing member to sever said deflected thread.

5. In a book-stitching machine, mechanism for severing the interconnecting threads of a continuously stitched book-pad, a plurality of thread-stitching needles, a plurality of movable thread-engaging members associated one with each thread-stitching needle, a plurality of stationary thread-severing members associated one with each thread engaging member, means for imparting intermittent movement to said thread-engaging members so that the threads are brought to said severing-members and contacted therewith in successive steps of movement of said thread-engaging members.

6. In a book-stitching machine, mechanism for severing the interconnecting threads of a continuously stitched book-pad, a plurality of thread-stitching needls, a plurality of movable thread-engaging members, associated one with each thread-stitching needle, a plurality of movable thread severing members associated one with each thread-engaging member, means for imparting movement to said thread-engaging members to displace from the path of travel of said needles the threads extending from said needles to the book-pad, and means for imparting movement to said thread-severing members to sever said deflected threads subsequent to the further stitching of said book-pad.

7. In a book-stitching machine, mechanism for severing the interconnecting threads of a continuously stitched book-pad, in combination, a plurality of thread-stitching needles, a plurality of thread-engaging members associated one with each needle, a connecting bar linked to said thread-engaging members, cam-actuated mechanism adapted to impart reciprocatory movement to said connecting bar and said thread engaging members, and means for timing the movement of said thread-engaging members relative to the book-stitching operations of the machine so that threads leading from said stitching needles to the book-pad are displaced from the path of movement of said needles and severed subsequent to the further stitching of the book-pad.

8. In a book-stitching machine, mechanism for severing the interconnecting threads of a continuously stitched book-pad, in combination, a plurality of thread-stitching needles, a needle guide, a carrier bar slidably mounted in said needle guide, a plurality of thread engaging members mounted upon said carrier bar and associated one with each stitching needle, said thread-engaging members each being provided with a thread-cutting edge, cam actuated mechanism adapted to impart reciprocatory movement to said carrier bar and said thread-engaging members, and means for timing the movement of said thread-engaging members relative to the book-stitching operations of the machine so that threads leading from said stitching needles to the book-pad are displaced from the path of movement of said needles and severed subsequent to the further stitching of the book-pad.

9. In a book-stitching machine, mechanism for severing the interconnecting threads of a continuously stitched book-pad, in combination, a plurality of thread-stitching needles, a needle guide, a plurality of thread-engaging members pivotally mounted upon said needle guide, and associated one with each stitching needle, a plurality of thread-severing members secured to said needle guide and associated one with each thread-engaging member, a connecting bar adapted to link together said thread-engaging members, cam-actuated mechanism adapted to impart reciprocatory movement to said connecting bar and said thread-engaging members, and means for timing the movement of said thread-engaging members relative to the stitch forming operations of the machine so that threads extending from said needles to the book-pad are deflected from the path of movement of said needles and brought into contact with said thread severing devices.

10. In a book-stitching machine, mechanism for severing the interconnecting threads of a continuously stitched book-pad, in combination, a plurality of thread-stitching needles, a needle guide, a plurality of thread-engaging members pivotally mounted upon said needle guide and associated one with each stitching needle, a plurality of thread-severing members pivotally mounted upon said needle guide and associated one with each thread-engaging member, a connecting bar serving to link together said thread-engaging members, cam actuated mechanism for imparting movement to said bar and said thread-engaging members, a second connecting bar serving to link together said thread-severing members, further cam-actuated mechanism adapted to impart movement to said second bar and said thread-severing members, and means for timing the movement of said thread-engaging members and said thread-severing members so that threads leading from said needles to the book-pad are deflected from the path of movement of said needles and then severed subsequent to the further stitching of the book-pad.

11. A method of mechanically severing a thread extending from a thread-stitching needle to a stitched book-pad, which includes the steps of displacing the thread from the path of the needle, holding the displaced thread in a stationary position during the stitching of additional sections of the book-pad, and then engaging said displaced thread with a suitable severing device.

12. In a book-stitching machine, mechanism for severing the interconnecting threads of a continuously stitched book-pad, comprising a member arranged to engage a thread which extends from a stitching needle to the stitched book-pad, means for displacing said thread-engaging member laterally so that the thread is displaced from the path of movement of said needle and held stationary during the stitching of additional sections of the book-pad, and thread-severing means arranged subsequently to sever said displaced thread.

13. In a book-stitching machine, mechanism for severing the interconnecting threads of a continuously-stitched book-pad, comprising a member arranged to engage a thread which extends from a stitching needle to the stitched book-pad, means for displacing said thread-engaging member laterally so that the thread is displaced from the path of movement of said needle and held stationary during the stitching of additional sections of the book-pad, and means for severing said thread subsequent to such further stitching operations and independently of the movement of the book-pad.

14. In a book-stitching machine, mechanism for severing the interconnecting threads of a continuously stitched book-pad, comprising a thread-severing member, a movable thread-engaging member arranged to engage a thread which extends from a stitching needle to the stitched book-pad, and means for imparting intermittent movement to said thread-engaging member so that said thread is displaced from the path of said needle, held in a stationary position during the stitching of additional sections of the book-pad, and then contacted with said thread-severing member.

15. In a book-stitching machine having a plurality of thread-stitching needles, mechanism for severing the interconnecting threads of a continuously stitched book-pad, comprising a plurality of thread-engaging members associated one with each thread-stitching needle, and means for displacing said thread-engaging members laterally in an intermittent movement so that the threads leading from the book-pad to the stitching needles are displaced from the path of movement of the needles and subsequently severed in a secondary movement of said thread-engaging members.

16. In a book-stitching machine having a plurality of thread-stitching needles, mechanism for severing the interconnecting threads of a continuously stitched book-pad, comprising a plurality of thread engaging members each provided with a thread-cutting edge and associated one with each thread-stitching needle, and means for displacing said thread-engaging members laterally in an intermittent movement so that the threads leading from the book-pad to the stitching needles are displaced from the path of movement of the needles and subsequently severed in a secondary movement of said thread-engaging members.

17. In a book-stitching machine, mechanism for severing the interconnecting threads of a continuously-stitched book-pad, comprising a thread-engaging member having a hooked extremity and a sharpened cutting edge adjacent said hooked extremity, means for displacing said thread-engaging member laterally in an intermittent movement, so that a thread leading from the book-pad to a stitching needle is displaced from the path of movement of said needle and subsequently severed in a secondary movement of said thread-engaging member.

18. In a book-stitching machine, mechanism for severing the interconnecting threads of a continuously-stitched book-pad, comprising a slidably mounted carrier bar, a thread-engaging member extending from said carrier bar and having its free extremity hooked and provided with a cutting edge, means for displacing said thread-engaging member laterally in an intermittent movement so that a thread leading from the book-pad to a stitching needle is displaced from the path of movement of said needle and subsequently severed by contact with said cutting edge in a secondary movement of said thread-engaging member.

OSCAR KLEINSCHMIT.
RUDOLF KLEMM.